(12) United States Patent
Zhi et al.

(10) Patent No.: US 11,409,524 B2
(45) Date of Patent: *Aug. 9, 2022

(54) APPARATUS AND METHODS FOR VECTOR OPERATIONS

(71) Applicant: Cambricon Technologies Corporation Limited, Beijing (CN)

(72) Inventors: Tian Zhi, Beijing (CN); Shaoli Liu, Beijing (CN); Qi Guo, Beijing (CN); Tianshi Chen, Beijing (CN); Yunji Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 92 days.

This patent is subject to a terminal disclaimer.

(21) Appl. No.: 16/171,293

(22) Filed: Oct. 25, 2018

(65) Prior Publication Data
US 2019/0065187 A1   Feb. 28, 2019

Related U.S. Application Data

(63) Continuation-in-part of application No. PCT/CN2016/082016, filed on May 13, 2016.

(30) Foreign Application Priority Data
Apr. 26, 2016   (CN) .......................... 201610266872.1

(51) Int. Cl.
G06F 17/16   (2006.01)
G06F 16/22   (2019.01)
(Continued)

(52) U.S. Cl.
CPC ...... *G06F 9/30021* (2013.01); *G06F 9/30032* (2013.01); *G06F 9/30036* (2013.01);
(Continued)

(58) Field of Classification Search
None
See application file for complete search history.

(56) References Cited

U.S. PATENT DOCUMENTS 5,526,506 A * 6/1996 Hyatt ...................... F21V 23/00
                                                      711/111
11,337,189 B2 * 5/2022 Li ........................... H04W 72/10
(Continued)

FOREIGN PATENT DOCUMENTS

CN   101685388 A   3/2010
CN   102103643 A   6/2011
(Continued)

OTHER PUBLICATIONS

Gehringer, G.Q. Kenney, Lecture-7, Vector Processors, Summer 1999 (Year: 1999).*
(Continued)

*Primary Examiner* — Hyun Nam
(74) *Attorney, Agent, or Firm* — Getech Law LLC; Jun Ye

(57) ABSTRACT

Aspects for vector operations in neural network are described herein. The aspects may include a vector caching unit configured to store a vector, wherein the vector includes one or more elements. The aspects may further include a computation module that includes one or more comparers configured to compare the one or more elements to generate an output result that satisfies a predetermined condition included in an instruction.

20 Claims, 4 Drawing Sheets

(51) Int. Cl.
  *G06F 9/30* (2018.01)
  *G06F 9/38* (2018.01)
  *G06F 15/80* (2006.01)
  *G06N 3/08* (2006.01)

(52) U.S. Cl.
  CPC ........ *G06F 9/30043* (2013.01); *G06F 9/3838* (2013.01); *G06F 9/3887* (2013.01); *G06F 15/8069* (2013.01); *G06F 15/8076* (2013.01); *G06F 17/16* (2013.01); *G06N 3/08* (2013.01)

(56) References Cited

U.S. PATENT DOCUMENTS

| | | | | |
|---|---|---|---|---|
| 2002/0157066 | A1* | 10/2002 | Marshall | H03K 19/17756 712/E9.035 |
| 2015/0055855 | A1* | 2/2015 | Rodriguez | G06K 9/627 382/155 |
| 2015/0089187 | A1* | 3/2015 | Gonion | G06F 9/3013 712/3 |
| 2015/0143086 | A1* | 5/2015 | Khan | G06F 9/3897 712/226 |
| 2015/0363688 | A1* | 12/2015 | Gao | G06N 3/082 706/27 |

FOREIGN PATENT DOCUMENTS

| | | |
|---|---|---|
| CN | 102262525 A | 11/2011 |
| EP | 1936492 A1 | 6/2008 |
| GB | 2382887 A | 6/2003 |
| WO | 2015073915 A1 | 5/2015 |
| WO | WO 2017/185419 A1 | 11/2017 |

OTHER PUBLICATIONS

Professor David A. Patterson, Lecture 6: Vector Processing, Spring 1998 (Year: 1998).*
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
201610266872.1—Office Action, dated May 24, 2019, 9 pages. (no English translation).
PCT/CN2016/082016—International Search Report, dated Jan. 24, 2017, 9 pages. (no English translation).
CN201610266872.1; Official Action dated Jan. 6, 2020, 10 Pages (No English Translation).
EP16899930.8; Official Action dated May 14, 2020, 4 Pages.
EP 16899930.8—European Search Report, dated Mar. 19, 2020, 4 pages.
EP 16899930.8—Rule 70b(1), mailed Mar. 20, 2020, 1 page.
EP 16899930.8—Response to Communication Pursuant to Article 94(3) EPC, filed Aug. 12, 2020, 18 pages.

* cited by examiner

APPARATUS AND METHODS FOR VECTOR OPERATIONS

CROSS-REFERENCE TO RELATED APPLICATIONS

The present invention is a continuation-in-part of PCT Application No. PCT/CN2016/082016, filed on May 13, 2016, which claims priority to commonly owned CN Application No. 201610266872.1, filed on Apr. 26, 2016. The entire contents of each of the aforementioned applications are incorporated herein by reference.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities. More specifically, logical operations for vectors may be performed frequently in deep learning processes in MMNs.

A known method to perform logical operations for vectors in a multilayer artificial neural network is to use a general-purpose processor. However, one of the defects of the method is low performance of a single general-purpose processor which cannot meet performance requirements for usual multilayer neural network operations with respect to a vector with a large number of elements.

Another known method to perform logical operations for vectors of the multilayer artificial neural network is to use a graphics processing unit (GPU). Such a method uses a general-purpose register file and a general-purpose stream processing unit to execute general purpose single-instruction-multiple-data (SIMD) instructions to support the algorithms in MNNs. However, since GPU only contains rather small on-chip caching, then data of the vector elements may be repeatedly moved from the off-chip, and off-chip bandwidth becomes a main performance bottleneck, causing huge power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for vector operations in a neural network. The example apparatus may include a vector caching unit configured to store a vector, wherein the vector includes one or more elements. The example apparatus may further include a computation module that includes one or more comparers configured to compare the one or more elements to generate an output result that satisfies a predetermined condition included in an instruction.

The example aspect of the present disclosure also provides an example method for vector operations in a neural network. The example method may include storing, by a vector caching unit, a vector, wherein the vector includes one or more elements; and comparing, by one or more comparers of a computation module, the one or more elements to generate an output result that satisfies a predetermined condition included in an instruction.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

A vector may refer to one or more values formatted in a one-dimensional data structure. The values included in a vector may be referred to as elements. The number of the elements in the vector may be referred to as a length of the vector. Various types of vector operations may be performed in a neural network. For example, the vector operations may include a logical MAX operation to identify a maximum value of the elements and a logical MIN operation to identify a minimum value of the elements.

Figure 1:
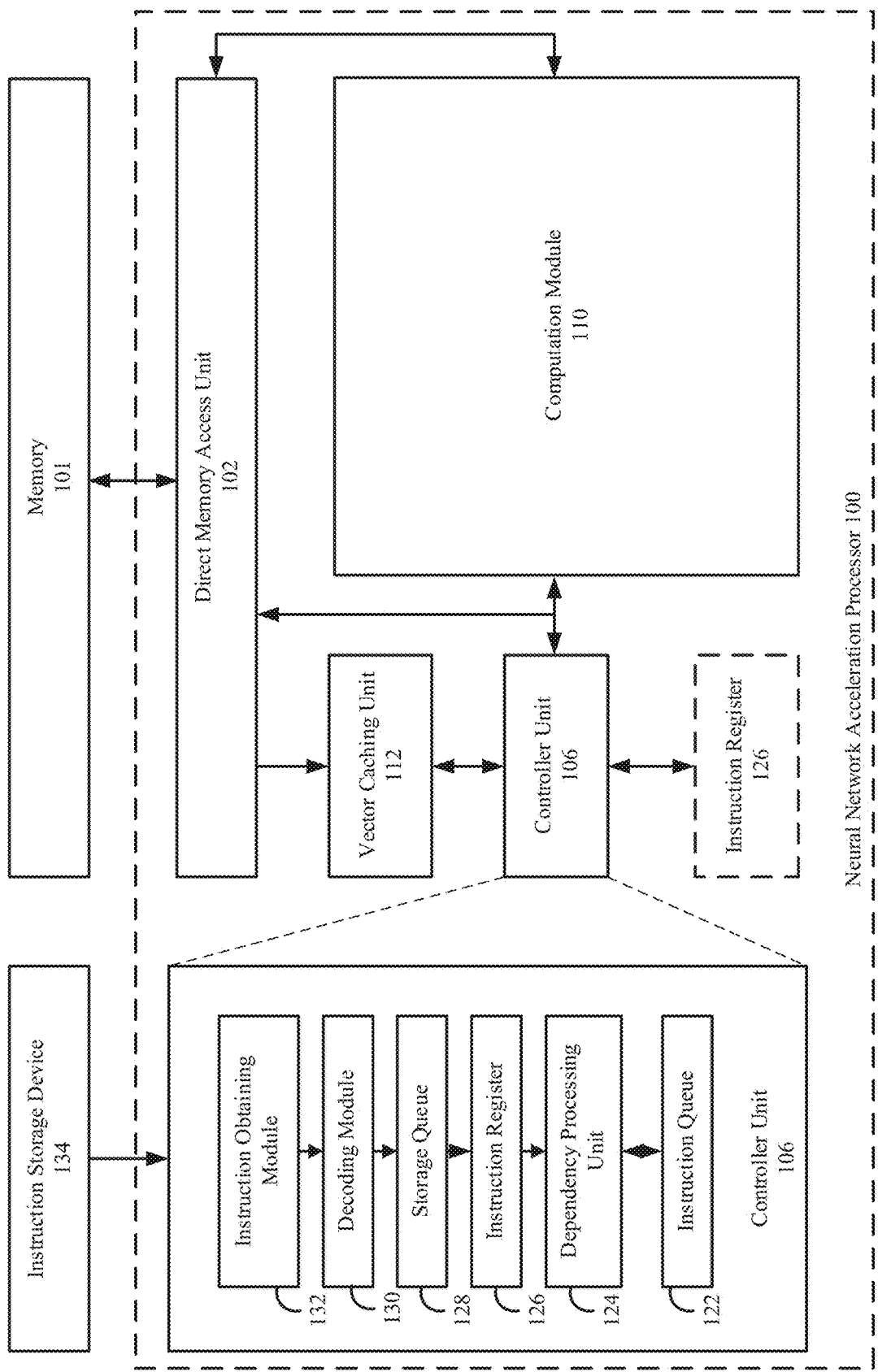
FIG. 1 illustrates a block diagram of an example neural network acceleration processor by which vector operations may be implemented in a neural network.

FIG. 1 illustrates a block diagram of an example neural network acceleration processor by which vector operations may be implemented in a neural network. As depicted, the example neural network acceleration processor 100 may include an instruction caching unit 104, a controller unit 106, a direct memory access unit 102, a computation module 110, and a vector caching unit 112. Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.).

In some examples, a vector operation instruction may originate from an instruction storage device 134 to the controller unit 106. An instruction obtaining module 132 may be configured to obtain a vector operation instruction from the instruction storage device 134 and transmit the instruction to a decoding module 130.

The decoding module 130 may be configured to decode the instruction. The instruction may include one or more operation fields that indicate parameters for executing the instruction. The parameters may refer to identification numbers of different registers ("register ID" hereinafter) in the instruction register 126. Thus, by modifying the parameters in the instruction register 126, the neural network acceleration processor 100 may modify the instruction without receiving new instructions. The decoded instruction may be transmitted by the decoding module 130 to an instruction queue module 128. In some other examples, the one or more operation fields may store immediate values such as addresses in the memory 101 and a scalar value, rather than the register IDs.

The instruction queue module 128 may be configured to temporarily store the received instruction and/or one or more previously received instructions. Further, the instruction queue module 128 may be configured to retrieve information according to the register IDs included in the instruction from the instruction register 126.

For example, the instruction queue module 128 may be configured to retrieve information corresponding to operation fields in the instruction from the instruction register 126. Information for the operation fields in a VMAX instruction may include an address of a vector and a length of the vector. As depicted, in some examples, the instruction register 126 may be implemented by one or more registers external to the controller unit 106. Once the relevant values are retrieved, the instruction may be sent to a dependency processing unit 124.

The dependency processing unit 124 may be configured to determine whether the instruction has a dependency relationship with the data of the previous instruction that is being executed. This instruction may be stored in the storage queue module 122 until it has no dependency relationship on the data with the previous instruction that has not finished executing. If the dependency relationship does not exist, the controller unit 106 may be configured to decode one of the instructions into micro-instructions for controlling operations of other modules including the direct memory access unit 102 and the computation module 110.

For example, the controller unit 106 may receive a vector-maximum (VMAX) instruction that includes a starting address of a vector, a length of the vector, and an address for an output result. According to the VMAX instruction, the direct memory access unit 102 may be configured to retrieve the vector from an external storage device, e.g., a memory 101, according to the starting address in the VMAX instruction. The retrieved vector may be transmitted to and stored in the vector caching unit 112.

In some other examples, the controller unit 106 may receive a vector-minimum (VMIN) instruction that includes a starting address of a vector, a length of the vector, and an address for an output result. According to the VMIN instruction, the direct memory access unit 102 may be configured to retrieve the vector from an external storage device, e.g., a memory 101 according to the starting address in the VMIN instruction. The retrieved vector may be transmitted to and stored in the vector caching unit 112.

The above mentioned instructions may be formatted as follows and may be stored in the instruction caching unit 104:

|  | Register 0 | Register 1 | Register 2 |
| --- | --- | --- | --- |
| VMAX | Starting address of a vector | Length of the vector | Output result |
| VMIN | Starting address of a vector | Length of the vector | Output result |

Hereinafter, a caching unit (e.g., the vector caching unit 112 etc.) may refer to an on-chip caching unit integrated in the neural network acceleration processor 100, rather than other storage devices in memory 101 or other external devices. In some examples, the on-chip caching unit may be implemented as a register file, an on-chip buffer, an on-chip Static Random Access Memory (SRAM), or other types of on-chip storage devices that may provide higher access speed than the external memory. In some other examples, the instruction register 126 may be implemented as a scratchpad memory, e.g., Dynamic random-access memory (DRAM), embedded DRAM (eDRAM), memristor, 3D-DRAM, non-volatile memory, etc.

Figure 2:
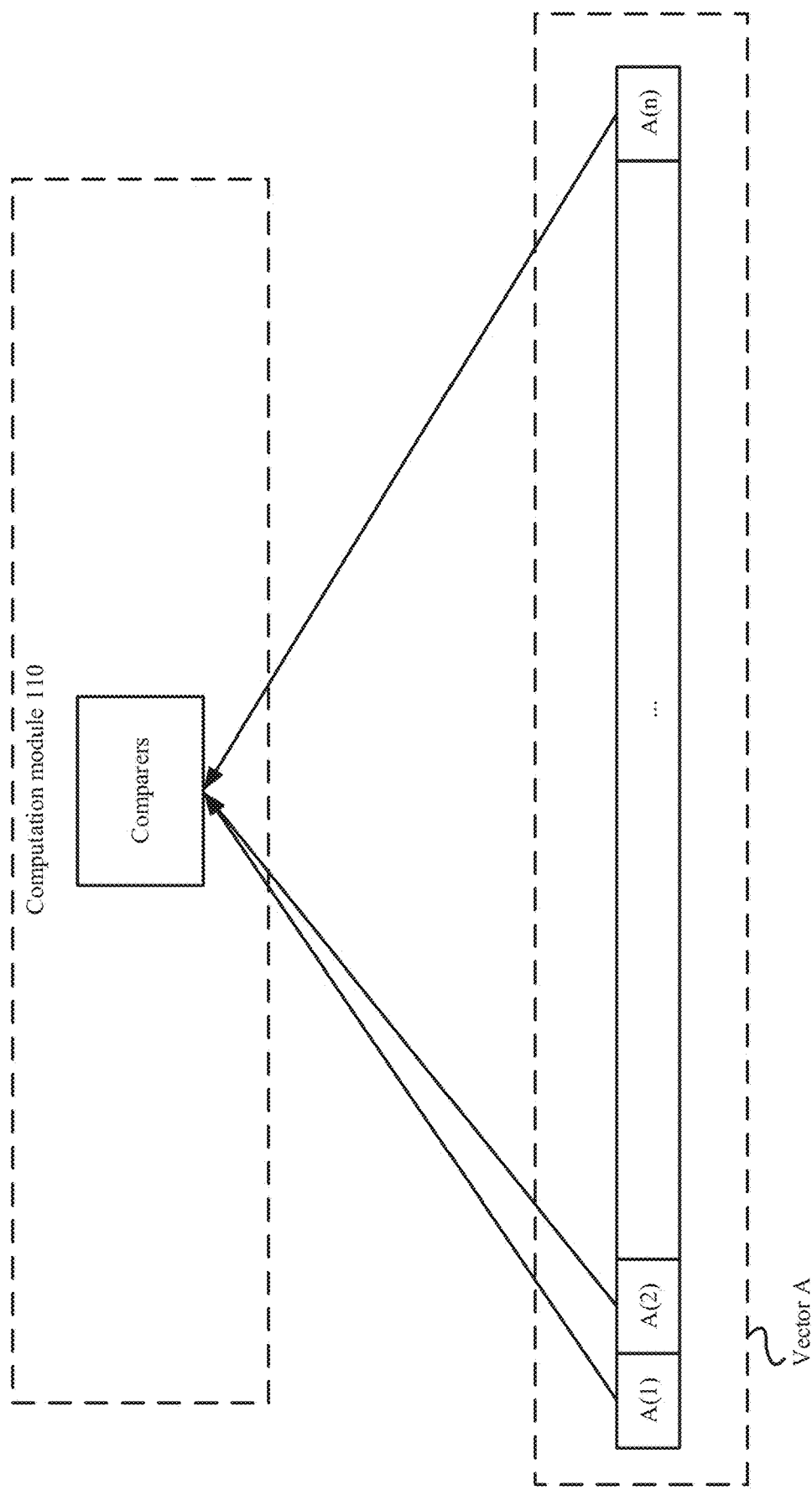
FIG. 2 illustrates an example logical operation process that may be performed by the example neural network acceleration processor.

FIG. 2 illustrates an example logical operation process that may be performed by the example neural network acceleration processor.

As depicted, the computation module 110 may be configured to perform logical operation to a vector ("Vector A"). The vector may include one or more elements respectively denoted as A(1), A(2), . . . A(n).

The computation module 110 may include one or more comparers. In response to a VMAX instruction, the one or more comparers may be configured to compare the elements, e.g., A(1), A(2), . . . A(n), to select a maximum value from the elements. The selected maximum value may be designated as an output result.

In response to a VMIN instruction, the one or more comparers may be configured to compare the elements, e.g., A(1), A(2), . . . A(n), to select a minimum value from the elements. The selected minimum value may be designated as an output result.

Figure 3:
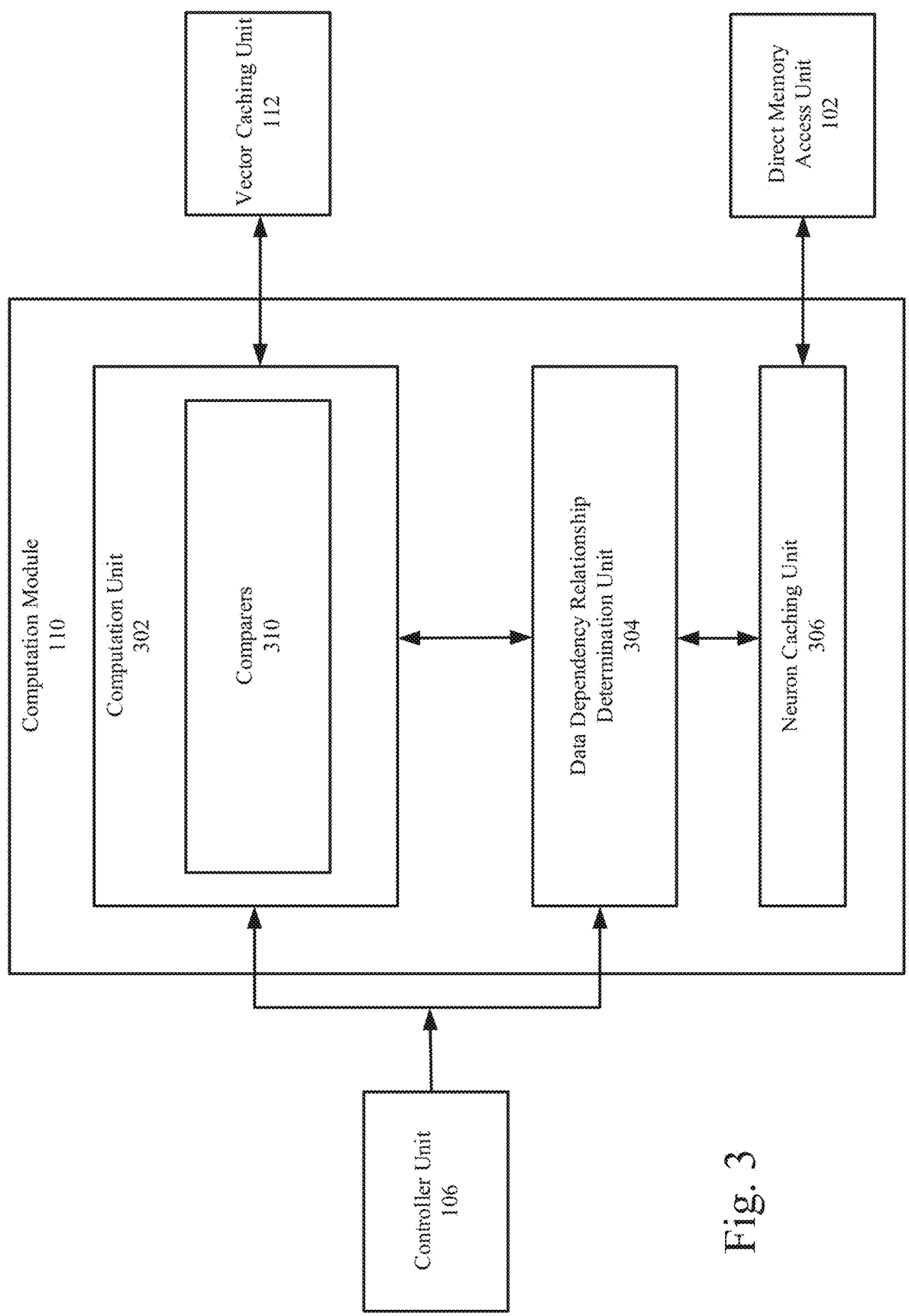
FIG. 3 illustrates an example computation module in the example neural network acceleration processor by which vector operations may be implemented in a neural network.

FIG. 3 illustrates an example computation module 110 in the example neural network acceleration processor by which vector operations may be implemented in a neural network.

As depicted, the computation module 110 may include a computation unit 302, a data dependency relationship determination unit 304, a neuron caching unit 306. The computation unit 302 may further include one or more comparers 310.

The data dependency relationship determination unit 304 may be configured to perform data access operations (e.g., reading or writing operations) on the caching units including the neuron caching unit 306 during the computation process. The data dependency relationship determination unit 304 may be configured to prevent conflicts in reading and writing of the data in the caching units. For example, the data dependency relationship determination unit 304 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the data dependency relationship determination unit 304 may be stored in an instruction queue within the data dependency relationship determination unit 304. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The neuron caching unit 306 may be configured to store the elements in the vector.

The computation unit 302 may be configured to receive the micro-instructions decoded from the vector operation instruction from the controller unit 106. In the example that the computation unit 302 receives micro-instructions decoded from a VMAX instruction, the one or more comparers 310 may be configured to compare the elements in the vector, e.g., A(1), A(2), . . . A(n), and to select a maximum value from the elements. In response to a VMIN instruction, the one or more comparers may be configured to compare the elements, e.g., A(1), A(2), . . . A(n), to select a minimum value from the elements. The selected minimum value may be designated as an output result.

Figure 4:
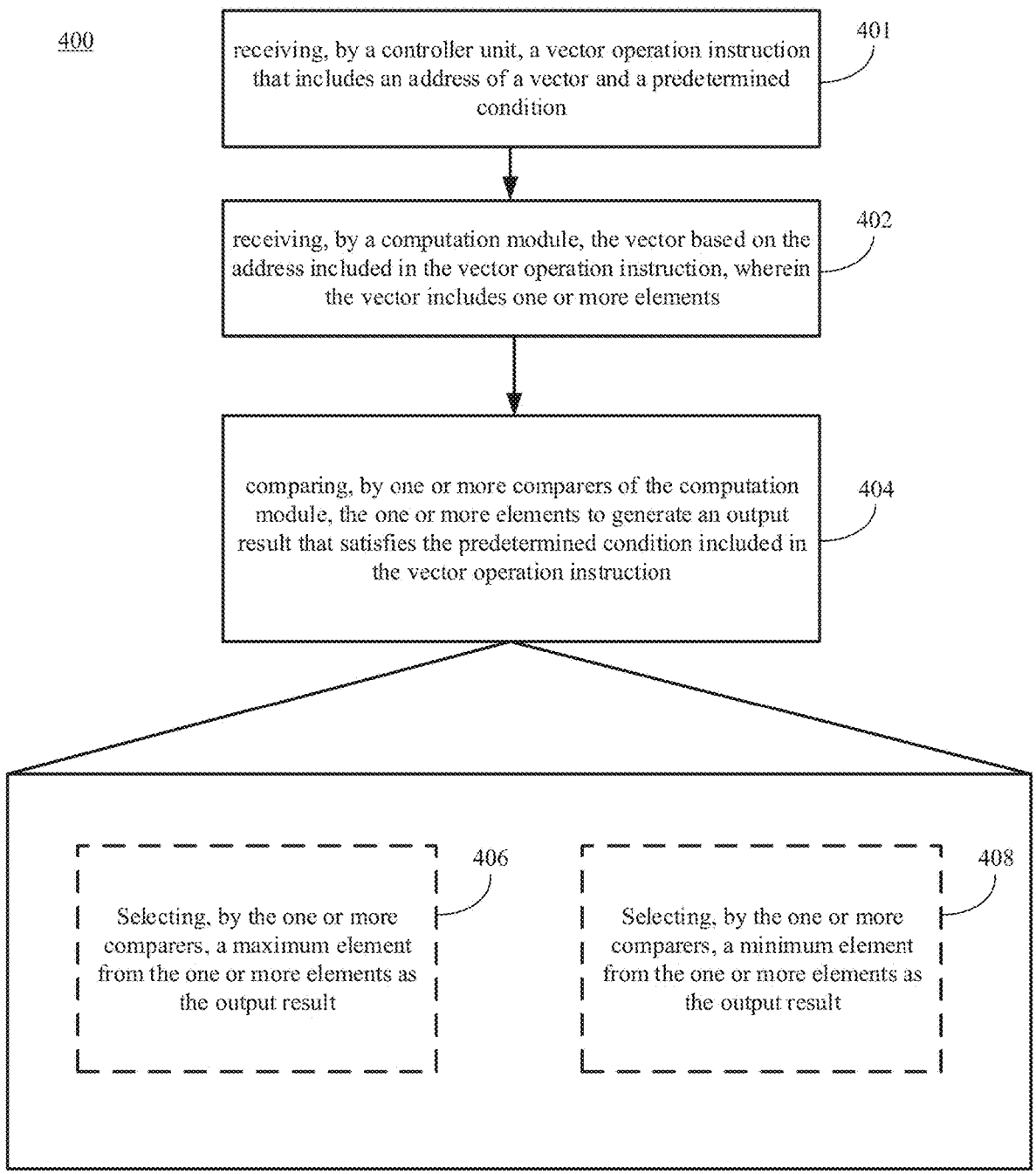
FIG. 4 illustrates a flow chart of an example method for performing logical operations between two vectors in a neural network.

FIG. 4 illustrates a flow chart of an example method 400 for performing logical operations between two vectors in a neural network. The method 400 may be performed by one or more components the apparatus of FIGS. 1 and 3. Optional or alternative operations may be shown in dash-lined blocks.

At block 401, the example method 400 may include receiving, by a controller unit, a vector operation instruction that includes an address of a vector and a predetermined condition. For example, the controller unit 106 may be configured to receive a VMAX instruction or a VMIN instruction that includes the address of the vector. The predetermined condition may indicate whether a minimum value or a maximum value of the elements should be selected.

At block 402, the example method 400 may include receiving, by a computation module, the vector based on the address included in the vector operation instruction, wherein the vector includes one or more elements. For example, the computation module 110 may receive the vector that includes the elements, e.g., A(1), A(2), . . . A(n).

At block 404, the example method 400 may include comparing, by one or more comparers of the computation module, the one or more elements to generate an output result that satisfies the predetermined condition included in the vector operation instruction. For example, the one or more comparers 310 may be configured to compare the elements and select an element that satisfies a predetermined condition in a received instruction.

At block 406, the example method 400 may optionally include selecting, by the one or more comparers, a maximum element from the one or more elements as the output result. In the example that the computation unit 302 receives micro-instructions decoded from a VMAX instruction, the predetermined condition in the VMAX instruction may refer to a maximum value among multiple values. The one or more comparers 310 may be configured to compare the elements in the vector, e.g., A(1), A(2), . . . A(n), and to select a maximum value from the elements as an output result.

At block 408, the example method 400 may optionally include selecting, by the one or more comparers, a minimum element from the one or more elements as the output result. In the example that the computation unit 302 receives micro-instructions decoded from a VMIN instruction, the predetermined condition in the VMIN instruction may refer to a minimum value among multiple values. The one or more comparers 310 may be configured to compare the elements in the vector, e.g., A(1), A(2), . . . A(n), and to select a minimum value from the elements as an output result.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for vector operations in a neural network, comprising:
   a controller circuit configured to receive a vector operation instruction that includes one or more register IDs that respectively identify one or more registers configured to store an address of a vector, a length of the vector, and a predetermined condition; and
   a computation circuit configured to receive the vector based on the address and the length of the vector included in the vector operation instruction,
   wherein the vector includes one or more elements, and
   wherein the computation circuit includes one or more comparers configured to compare the one or more elements to generate an output result that satisfies the predetermined condition included in the vector operation instruction.

2. The apparatus of claim 1, wherein the comparers are configured to select a maximum element from the one or more elements as the output result.

3. The apparatus of claim 1, wherein the comparers are configured to select a minimum element from the one or more elements as the output result.

4. The apparatus of claim 1, wherein the controller circuit comprises an instruction obtaining circuit configured to obtain the vector operation instruction from an instruction storage device.

5. The apparatus of claim 4, wherein the controller circuit further comprises a decoding circuit configured to decode the vector operation instruction into one or more micro-instructions.

6. The apparatus of claim 5, wherein the controller circuit further comprises an instruction queue circuit configured to temporarily store the vector operation instruction and one or more previously received instructions, and retrieve information corresponding to operation fields in the vector operation instruction.

7. The apparatus of claim 6, wherein the controller circuit further comprises an instruction register configured to store the information corresponding to the operation fields in the vector operation instruction.

8. The apparatus of claim 7, wherein the controller circuit further comprises a dependency processing circuit configured to determine whether the vector operation instruction has a dependency relationship with the one or more previously received instructions.

9. The apparatus of claim 8, wherein the controller circuit further comprises a storage queue circuit configured to store the vector operation instruction while the dependency processing circuit is determining whether the vector operation instruction has the dependency relationship with the one or more previously received instructions.

10. A method for vector operations in a neural network, comprising:
    receiving, by a controller unit, a vector operation instruction that includes one or more register IDs that respectively identify one or more registers configured to store an address of a vector, a length of the vector, and a predetermined condition;
    receiving, by a computation circuit, the vector based on the address and the length of the vector included in the vector operation instruction, wherein the vector includes one or more elements; and
    comparing, by one or more comparers of the computation circuit, the one or more elements to generate an output result that satisfies the predetermined condition included in the vector operation instruction.

11. The method of claim 10, further comprising selecting, by the one or more comparers, a maximum element from the one or more elements as the output result.

12. The method of claim 10, further comprising selecting, by the one or more comparers, a minimum element from the one or more elements as the output result.

13. The method of claim 10, further comprising obtaining, by an instruction obtaining circuit of the controller unit, the vector dot product instruction from an instruction storage device.

14. The method of claim 13, further comprising decoding, by a decoding circuit of the controller unit, the vector dot product instruction into one or more micro-instructions.

15. The method of claim 14, further comprising temporarily storing, by an instruction queue circuit of the controller unit, the vector dot product instruction and one or more previously received instructions, and retrieve information corresponding to operation fields in the vector dot product instruction.

16. The method of claim 15, further comprising storing, by an instruction register of the controller unit, the information corresponding to the operation fields in the vector dot product instruction.

17. The method of claim 16, further comprising determining, by a dependency processing circuit of the controller circuit, whether the vector dot product instruction has a dependency relationship with the one or more previously received instructions.

18. The method of claim 17, further comprising storing, by a storage queue circuit of the controller unit, the vector dot product instruction while the dependency processing circuit is determining whether the vector dot product instruction has the dependency relationship with the one or more previously received instructions.

19. The method of claim 18, wherein the instruction register is configured to store the address of the vector and a length of the vector.

20. The method of claim 19, wherein the instruction register is configured to store an address of the output result.

* * * * *